United States Patent
Bremmer et al.

(10) Patent No.: US 7,343,797 B2
(45) Date of Patent: Mar. 18, 2008

(54) METHOD AND SYSTEM FOR DETERMINING LEVEL OF FUEL

(75) Inventors: Lavern M Bremmer, Dexter, MI (US); Trevor Enge, West Bloomfield, MI (US); Robert W Schmidt, Novi, MI (US); Michael R Teets, Grosse Pointe Park, MI (US)

(73) Assignee: Chrysler LLC, Auburn Hills, MI (US)

( * ) Notice: Subject to any disclaimer, the term of this patent is extended or adjusted under 35 U.S.C. 154(b) by 87 days.

(21) Appl. No.: 11/182,176

(22) Filed: Jul. 15, 2005

(65) Prior Publication Data

US 2007/0012102 A1    Jan. 18, 2007

(51) Int. Cl.
    *G01F 23/00*    (2006.01)
(52) U.S. Cl. ........................... 73/299; 73/290 R
(58) Field of Classification Search ........... 73/299, 73/303, 290 R; 702/55
    See application file for complete search history.

(56) References Cited

U.S. PATENT DOCUMENTS

| | | | | |
|---|---|---|---|---|
| 1,905,172 A | * | 4/1933 | Howse | .................. 73/303 |
| 6,679,226 B2 | * | 1/2004 | Burke et al. | ................ 123/509 |
| 6,931,926 B1 | * | 8/2005 | Van Ee | ......................... 73/299 |
| 6,941,808 B2 | * | 9/2005 | Gouzou et al. | ................ 73/313 |
| 2004/0215407 A1 | | 10/2004 | Thielman et al. | |
| 2005/0189275 A1 | * | 9/2005 | Stewart | ....................... 210/86 |
| 2006/0231079 A1 | * | 10/2006 | Paluszewski | ................ 123/514 |

FOREIGN PATENT DOCUMENTS

DE    4112559 A1 * 10/1992

* cited by examiner

*Primary Examiner*—Daniel S. Larkin
*Assistant Examiner*—Rodney Frank
(74) *Attorney, Agent, or Firm*—Ralph E. Smith

(57) ABSTRACT

A method and system for determining the level of fuel contained in the tank of a motor vehicle includes a fuel pump disposed in the tank for creating a flow of fuel in the tank. An elongated tube is placed vertically in the tank. The system also includes a venturi tube coupled between the fuel pump and the elongated tube for creating a vacuum as a result of a portion of the flow of fuel therethrough from the fuel pump thereby drawing fuel vapor from the elongated tube at a varying pressure, the pressure decreasing as the amount of fuel vapor in the tank increases. A controller is coupled to the elongated tube for determining the level of fuel in the tank based on the pressure.

11 Claims, 1 Drawing Sheet

METHOD AND SYSTEM FOR DETERMINING LEVEL OF FUEL

FIELD OF THE INVENTION

The present invention relates to a method and system for determining the level of fuel contained in the tank of a motor vehicle.

BACKGROUND OF THE INVENTION

Fuel tanks of modern motor vehicles often have extremely irregular shape and disposition. This, in one sense, results in the fact that the indication of the level of fuel in the tank, typically provided by a sensor of one of the various known types, is not easily convertible into a reliable indication of the quantity of fuel available. Unreliability in the information relating to the quantity of fuel available has a particularly negative impact on the motor vehicle user upon starting out (beginning of a trip or journey) and, during journeys, on inclined roads.

Systems for indicating fuel level currently in use include mechanical, electromechanical or electronic "damping" means which makes it possible to attenuate the oscillations of the indication provided to the use upon variation in the level of the fuel in the tank due to swashing and in general, to oscillations in the level due to maneuvers or dynamic conditions involving rapid variations of the vehicle such as accelerations, braking, etc. Such systems thus allow rapid dynamic variations in the level of the fuel which, in fact, do not correspond to effective variations in the quantity of fuel available in the tank, to be "filtered."

Systems for indicating fuel level also typically include moving parts, which result in complexity and reliability problems. Thus, there exists a need for a simple system for determining fuel level in a fuel tank of a motor vehicle that is reliable.

SUMMARY OF THE INVENTION

It is an object of the present invention to provide a system for determining the level of fuel contained in the tank of a motor vehicle, the tank having both fuel and fuel vapor present therein. The system includes a fuel pump disposed in the tank for creating a flow of fuel in the tank and an elongated tube placed vertically in the tank. The system also includes a venturi tube coupled between the fuel pump and the elongated tube for creating a vacuum as a result of a portion of the flow of fuel therethrough from the fuel pump thereby drawing fuel vapor from the tube at a varying pressure, the pressure decreasing as the amount of fuel vapor in the tank increases. The system further includes a controller coupled to the elongated tube for determining the level of fuel in the tank based on the pressure.

It is another object of the present invention to provide a method for determining the level of fuel contained in the tank of a motor vehicle wherein the tank includes both fuel and fuel vapor present therein. The method includes creating a flow of fuel in the tank. The method also includes the step of creating a vacuum as a result of a portion of the flow of fuel passing through a venturi tube thereby drawing fuel vapor from the tank at a pressure, the pressure decreasing as the amount of fuel vapor in the tank increases. The method still further includes the step of determining the level of fuel in the tank based on the pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
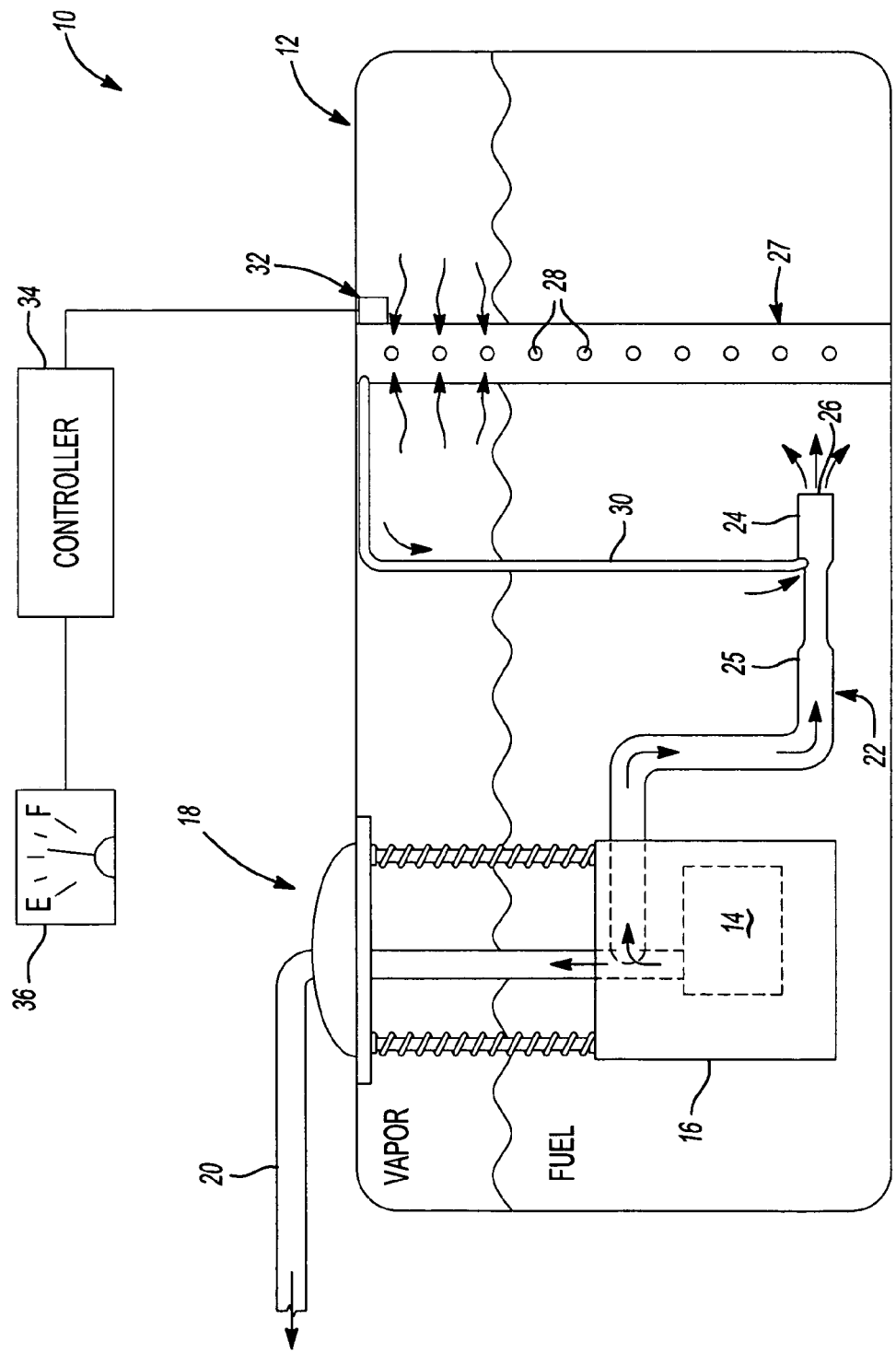
FIG. 1 is a representation, in block diagram form, of a preferred embodiment of a system according to the present invention.

The following description of the preferred embodiment(s) is merely exemplary in nature and is in no way intended to limit the invention, its application, or uses.

In FIG. 1 a system 10 according to the invention for determining the level or quantity of fuel contained in a tank 12 of a motor vehicle (not shown) is represented. A fuel pump 14 is disposed in a reservoir 16 in the tank 12 for delivering fuel at a predetermined pressure to the fuel rail 20 via a fuel module 18.

A small portion of the fuel flow from the fuel pump 14 is bled off to a converging/diverging venturi tube 22 that is coupled to the fuel pump 14. At a divergence 24 of the venturi tube 22 a vacuum is created as a result of fuel flow from the fuel pump 14 converging at convergence 25 just prior to the divergence 24. The venturi tube 22 empties into the fuel tank 12 or back into the reservoir 16 via an open end 26.

An elongated tube 27 is placed inside the tank 12 in a vertical position. The elongated tube 27 preferably has a plurality of perforations, such as holes, throughout the tube to allow fuel vapor to flow therethrough. A small interconnect tube 30 is coupled between the elongated tube 27 and the venturi tube 22.

Because of the vacuum created at the divergence 24, fuel vapor is drawn into the venturi tube 22 via the interconnect tube 30 at a varying pressure. The pressure varies because as the level of fuel drops, or decreases, and more perforations 28 are exposed, the pressure required to draw fuel vapor into the venturi tube 22 decreases. Thus, there is a correlation between pressure and fuel level.

Accordingly, the system 10 includes a pressure transducer 32 coupled to an interior of the elongated tube 27. The pressure transducer 32 coverts pressure into an electrical signal for receipt by a controller 34 coupled to the pressure transducer 32. The controller 34 contains a look-up table in which the correlation between pressure and fuel level is predetermined and stored.

Finally, coupled to the controller 34 is a display 36 for displaying the fuel level based on the pressure as determined by the controller 34. The display could be either an analog or a digital display.

Thus, in summary, the present invention determines the level of fuel contained in a fuel tank 12 by creating a flow of fuel in the tank. The method also includes the step of creating a vacuum as a result of a portion of the flow of fuel passing through a venturi tube thereby drawing fuel vapor from the tank at a varying pressure, the pressure decreasing as the amount of fuel vapor in the tank increases. The method still further includes the step of determining the level of fuel in the tank based on the pressure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for determining a level of fuel contained in a tank of a motor vehicle containing both fuel and fuel vapor, the system comprising:

a fuel pump disposed in the tank that creates a flow of fuel in the tank and supplies fuel to a fuel rail of the motor vehicle;

an elongated tube placed vertically in the tank;

a venturi tube coupled between the fuel pump and the elongated tube that creates a vacuum as a result of a portion of the flow of fuel through the venturi tube from the fuel pump, and the vacuum created by the venturi tube draws fuel vapor from the elongated tube at a varying pressure, the pressure decreasing as the amount of fuel vapor in the tank increases, and a controller coupled to the elongated tube for determining the level of fuel in the tank based on the pressure.

2. The system as recited in claim 1 further comprising:

a pressure transducer coupled to the elongated tube and the controller for determining the pressure at an interior of the elongated tube.

3. The system as recited in claim 1 further comprising:

a display coupled to the controller for displaying the level of fuel in the tank.

4. The system as recited in claim 1 wherein the tube has a plurality of perforations along a length of the elongated tube and wherein fuel vapor is drawn through the perforations.

5. The system as recited in claim 1 wherein the elongated tube is constructed of a plastic material.

6. The system as recited in claim 1 wherein the elongated tube is constructed of a metal material.

7. The system as recited in claim 4 wherein the perforations are holes.

8. The system as recited in claim 1 wherein the venturi tube is coupled to the elongated tube via an interconnect tube.

9. A method for determining a level of fuel contained in a tank of a motor vehicle containing both fuel and fuel vapor, the method comprising:

providing a fuel pump that delivers fuel to a fuel rail of the motor vehicle;

creating a flow of fuel in the tank with the fuel pump;

creating a vacuum as a result of a portion of the flow of fuel flowing through a venturi tube;

using the vacuum created by the venturi tube to draw fuel vapor from the fuel tank at a varying pressure, the pressure decreasing as the amount of fuel vapor in the tank increases; and determining the level of fuel in the tank based on the pressure.

10. The method as recited in claim 9 further comprising displaying the level of fuel in the tank.

11. A method for determining a level of fuel contained in a tank of a motor vehicle containing both fuel and fuel vapor, the method comprising:

creating a flow of fuel in the tank;

creating a vacuum as a result of a portion of the flow of fuel flowing through a venturi tube;

using the vacuum created by the venturi tube to draw fuel vapor from the fuel tank at a varying pressure, the pressure decreasing as the amount of fuel vapor in the tank increases; and determining the level of fuel in the tank based on the pressure.

* * * * *